G. H. STULTZ.
FRAME FOR AUTOMOBILE BEDS.
APPLICATION FILED JULY 16, 1921.
1,420,889. Patented June 27, 1922.
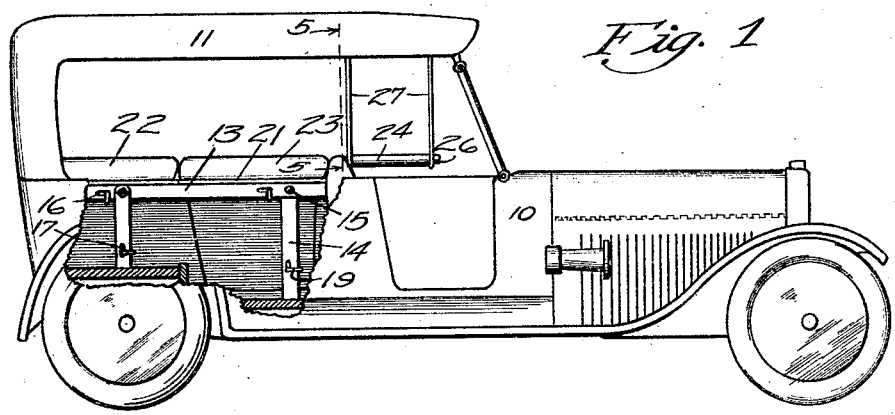
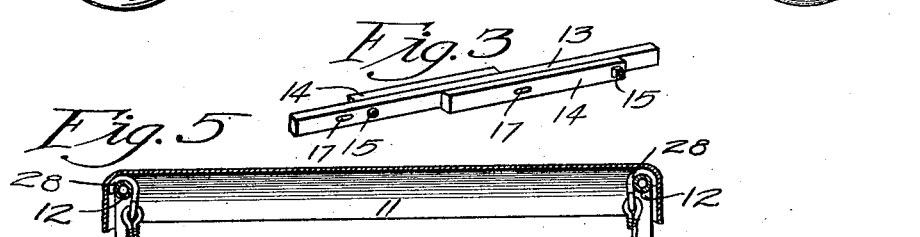
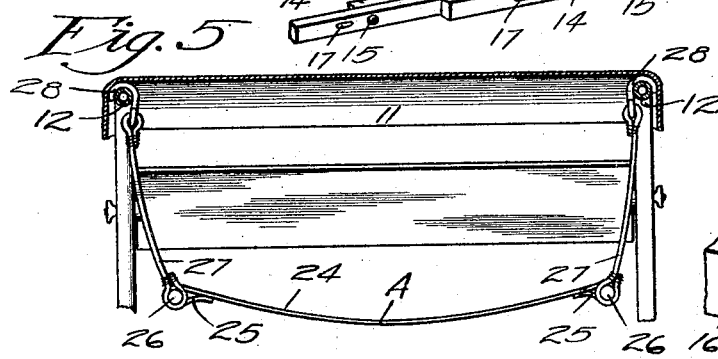
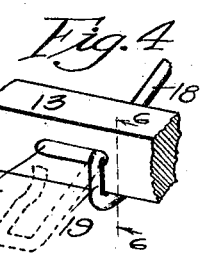
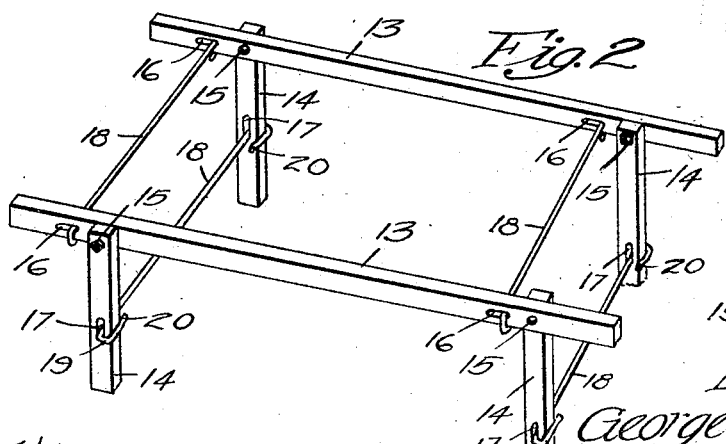
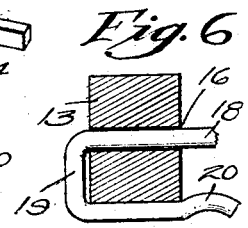
Inventor
George H. Stultz
By Bair & Freeman Attys
Witness
Lynn Latta

UNITED STATES PATENT OFFICE.

GEORGE H. STULTZ, OF WINTERSET, IOWA.

FRAME FOR AUTOMOBILE BEDS.

1,420,889.  Specification of Letters Patent.  Patented June 27, 1922.

Application filed July 16, 1921. Serial No. 485,263.

*To all whom it may concern:*

Be it known that I, GEORGE H. STULTZ, a citizen of the United States, and a resident of Winterset, in the county of Madison and State of Iowa, have invented a certain new and useful Frame for Automobile Beds, of which the following is a specification.

The object of my invention is to provide an automobile bed of simple, durable and comparatively inexpensive construction.

More particularly, my invention relates to a bed adapted to be made in an automobile, and formed by using parts of the automobile.

Still another object is to provide a frame for supporting parts of the automobile, which compose the bed, the frame being collapsible and being capable of being folded to position, where it will occupy only a minimum amount of space.

Still another object is to provide a pair of supporting bars having legs pivotally connected thereto and means for holding the supporting bars and legs against inward movement or movement from each other.

With these and other objects in view, my invention consists in the construction, arrangement and combination of the various parts of my device, whereby the objects contemplated are attained, as hereinafter more fully set forth, pointed out in my claim, and illustrated in the accompanying drawings, in which:

Figure 1 is a side elevation of an automobile with my improved invention installed therein, parts being broken away to better illustrate the construction.

Figure 2 is a perspective view of the framework, which supports and forms a part of the bed.

Figure 3 is a collapsed view of one of the supporting members.

Figure 4 is a detail, perspective view, showing how the supporting bars are held in proper position.

Figure 5 is a detail, sectional view taken on the line 5—5 of Figure 1, showing how the foot rest of the bed is suspended from the top of the automobile; and Figure 6 is a detail, sectional view taken on the line 6—6 of Figure 4.

In the accompanying drawings, I have used the reference numeral 10 to indicate generally an automobile, which is provided with a top 11, which top 11 is supported on cross bars or pipes 12.

My improved frame for an automobile bed, comprises a pair of supporting bars 13, having legs 14 pivoted thereto by means of the bolts 15.

The supporting bars 13 are designed to be received between the back of the front seat of the automobile and the front of the back seat of the automomible, as clearly shown in Figure 1 of the drawings.

The legs 14 of the frame may be made of various lengths, so that they properly fit in the automobile.

In order to prevent the movement of the supporting bars and legs toward each other or from each other, I provide slots 16 in the supporting bars 13 and slots 17 in the legs 14.

Spacing rods 18 are provided, which have hook portions 19 on the ends thereof. Each of the free ends of the hook portions 19 of the spacing rods 18 are provided with a curved portion 20, the purpose of which will be hereafter more fully set forth.

In setting the supporting bars in position, the hook portions 19 of the spacing rods are extended through the slots. After the entire hook portion 19 has been extended through the slot, the spacing rods are turned substantially a quarter turn, so that the hook portion 19 no longer registers with the slot 16.

The supporting bars 13 are then moved outwardly or away from each other, until a portion of the supporting bars 13 are engaged in the hook portion 19 of the spacing rods 18.

The end of the spacing rods 18 are made of resilient material, so as to permit the supporting bars 13 to be slid between the curved portion 20 and the body portion of the spacing rods 18.

After the supporting bars have been forced between the curved portion 20 and the spacing rod 18, the parts will spring back to their normal position, thus holding the supporting bars 13 against either outward movement or inward movement.

Yet when it is desired to collapse the frame-work by using a slight amount of force, the supporting bars may be pulled inwardly against the yielding action of the hook portion 19 and the curved portion 20 of the spacing rod.

The spacing rods 18 are also designed to be received in the slots 17 formed in the legs 14.

The operation of placing the spacing rods in position or moving them from operative to inoperative position is similar to the operation of the spacing rods for holding the supporting rods against movement.

From the construction of the parts just described, it will be seen that a rigid framework is substantially made up from the spacing rods and the supporting bars and legs. This is clearly illustrated in Figure 2 of the drawings.

In order to complete the bed, I take slats 21, which may be the portions ordinarily placed under the seats of the automobile and place them so that they rest upon the supporting bars 13.

The front and back seat cushions 22 and 23 of the automobile are then used and placed over the slats 21 and on the supporting bars 13. Ordinarily the front and back seat cushions will fill the space between the front side of the back seat and the back side of the front seat.

This, however, is not quite long enough to form a comfortable bed, so I provide a portion A, which I call the foot rest portion, which portion is composed of a strip of canvas 24, having loops 25 fixed to its side edges. Bars 26 are received in the loops 25.

Cords 27 are fixed to the bars 26 and have hook members 28 at their outer ends. The hook members 28 are designed to extend over the bars 12 of the top 11.

The foot rest member A is designed to be placed directly above the front seat of the automobile, so that the cushions 22 and 23 and the portion A form one continuous bed.

It will be understood that the cords 27 are cut the right length, so as to make the canvas member 24 rest in substantially the same plane as the top of the cushions 22 and 23.

It will be seen that I have provided a very efficient automobile bed, which can easily be set up or taken down and yet it is not necessary to carry any large amount of extra material to form the bed.

It will be understood that if it is desirable, the ends of the supporting rods may be provided with pads (not shown) so as to prevent the back of the front seat from being marred.

Some changes may be made in the construction and arrangement of the various parts of my device, without departing from the essential features and purposes of my invention, and it is my intention to cover by my claim, any modified forms of structure, or use of mechanical equivalents, which may be reasonably included within its scope.

I claim as my invention:

A bed adapted to be used with an automobile including a pair of supporting bars having legs pivoted thereto, means for connecting and holding said pair of supporting bars in position, said means including slots cut in the supporting bars and said legs and arranged lengthwise of the supporting bars and said legs, rods having hook portions thereon adapted to extend through said slots and engage a portion of said bars and said legs for preventing their movement, said supporting bars being designed to be received between the front and back seat of the automobile, said supporting bars being designed to receive the automobile seat cushions, and a suspended foot rest secured to the automobile top frame and adapted to hang over the front seat of the automobile and adjacent to the forward end of the bed for making a continuous and complete bed.

Des Moines, Iowa, July 11, 1921.

GEORGE H. STULTZ.